US012715218B2

(12) United States Patent
Kudo et al.

(10) Patent No.: US 12,715,218 B2
(45) Date of Patent: Aug. 25, 2026

(54) PRINTING APPARATUS INCLUDING A PLURALITY OF PRINT HEADS FOR EJECTING INK AND A MAINTENANCE UNIT FOR PERFORMING MAINTENANCE ON THE PRINT HEADS

(71) Applicant: CANON KABUSHIKI KAISHA, Tokyo (JP)

(72) Inventors: Ran Kudo, Tokyo (JP); Tetsuji Suzuki, Kanagawa (JP); Ryosuke Araki, Kanagawa (JP); Yoshiyuki Inamoto, Kanagawa (JP); Shu Kurihara, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 124 days.

(21) Appl. No.: 18/744,470

(22) Filed: Jun. 14, 2024

(65) Prior Publication Data

US 2024/0424792 A1 Dec. 26, 2024

(30) Foreign Application Priority Data

Jun. 20, 2023 (JP) ................................ 2023-100697

(51) Int. Cl.
*B41J 2/165* (2006.01)
*B41J 2/15* (2006.01)
(Continued)

(52) U.S. Cl.
CPC ........... *B41J 2/16508* (2013.01); *B41J 2/155* (2013.01); *B41J 2/16585* (2013.01);
(Continued)

(58) Field of Classification Search
CPC .... B41J 2/16508; B41J 2/155; B41J 2/16585; B41J 2/1721; B41J 2/175; B41J 2/16523;
(Continued)

(56) References Cited

U.S. PATENT DOCUMENTS 6,120,201 A * 9/2000 McKay .................. B41J 29/026 400/692
2007/0263027 A1 11/2007 Suzuki et al. ........... B41J 2/165
(Continued)

FOREIGN PATENT DOCUMENTS

JP 2010-058338 3/2010

OTHER PUBLICATIONS

U.S. Appl. No. 18/752,607, filed Jun. 24, 2024.
(Continued)

*Primary Examiner* — Jason S Uhlenhake
(74) *Attorney, Agent, or Firm* — Venable LLP

(57) ABSTRACT

A printing apparatus including a plurality of print heads configured to eject liquid, a maintenance unit configured to perform maintenance on the plurality of printheads and detachable units provided in correspondence to the plurality of printheads and each including a negative pressure tank used for suction by the maintenance unit and a pump for generating negative pressure, wherein the detachable units each includes a valve configured to open and to close a flow channel and wherein the negative pressure tank is disposed at a location lower than the valve and the pump in a direction of gravitational force.

15 Claims, 11 Drawing Sheets

(51) Int. Cl.
*B41J 2/155* (2006.01)
*B41J 2/17* (2006.01)
*B41J 29/377* (2006.01)

(52) U.S. Cl.
CPC ........... *B41J 2/1721* (2013.01); *B41J 29/377* (2013.01); *B41J 2002/16594* (2013.01)

(58) Field of Classification Search
CPC .. B41J 2/17596; B41J 2/1752; B41J 2/16552; B41J 29/377; B41J 2002/16594
See application file for complete search history.

(56) References Cited

U.S. PATENT DOCUMENTS

| | | | | |
|---|---|---|---|---|
| 2010/0033531 | A1 | 2/2010 | Suzuki et al. | B41J 2/165 |
| 2013/0100199 | A1 | 4/2013 | Suzuki et al. | B41J 2/165 |
| 2015/0266306 | A1 | 9/2015 | Sunouchi et al. | B41J 2/175 |
| 2016/0144626 | A1 | 5/2016 | Nakagawa et al. | B41J 2/165 |
| 2017/0129243 | A1* | 5/2017 | Otagiri | B41J 2/16511 |
| 2023/0150286 | A1* | 5/2023 | Tojo | B41J 29/02 347/5 |
| 2024/0308223 | A1 | 9/2024 | Araki et al. | B41J 2/165 |

OTHER PUBLICATIONS

U.S. Appl. No. 18/763,293, filed Jul. 3, 2024.
U.S. Appl. No. 18/778,957, filed Jul. 20, 2024.
U.S. Appl. No. 18/913,794, filed Oct. 11, 2024.

* cited by examiner

PRINTING APPARATUS INCLUDING A PLURALITY OF PRINT HEADS FOR EJECTING INK AND A MAINTENANCE UNIT FOR PERFORMING MAINTENANCE ON THE PRINT HEADS

BACKGROUND OF THE INVENTION

Cross-Reference to Related Application

This application claims the benefit of Japanese Patent Application No. 2023-100697, filed Jun. 20, 2023, which is hereby incorporated by reference herein in its entirety.

Field of the Invention

The present disclosure relates to a printing apparatus.

Description of the Related Art

There is known a line-head printing apparatus that performs printing by ejecting liquid droplets from a printhead in conjunction with conveyance of a printing medium without the printhead moving relative to the main body of the apparatus. In the process of forming an image, such a printing apparatus may experience a situation where ink ejected from nozzles does not land on a sheet, but drifts as mist and attaches to the nozzles. This, as a result, may cause deviation of ejected ink droplets and cause lower image quality.

Japanese Patent Laid-Open No. 2010-58338 discloses a cleaning configuration unit that maintains ejection performance by wiping an ejection nozzle formation surface with an elastic blade to restore the ejection nozzle surface to its pre-ejection state.

In a printing apparatus having a plurality of printing heads and a plurality of cleaning configuration units, a plurality of sets of various pumps and on-off valves may be disposed to perform negative pressure suction on the respective cleaning configuration units. As a result, a larger space may be needed to dispose the members. Also, disposing the members such as the various pumps and on-off valves in a limited space makes it difficult for a user to have access to those members. As a result, it is difficult for a user to perform maintenance work on the members, including replacement work performed in the event of accidental failure.

SUMMARY OF THE INVENTION

A printing apparatus according to an aspect of the present disclosure has a circulation unit including a first liquid moving unit configured to supply liquid to a printhead and a second liquid moving unit configured to discharge the liquid circulated inside the printhead and not ejected from an ejection port to an outside of the printhead, a head unit including the printhead and a holding unit configured to hold the printhead, and a head moving unit configured to be able to move the head unit in a first direction, and the circulation unit overlaps with a projection plane of the head unit and is not moved by the head moving unit.

Further features of the present invention will become apparent from the following description of exemplary embodiments with reference to the attached drawings.

DESCRIPTION OF THE EMBODIMENTS

Figure 1:
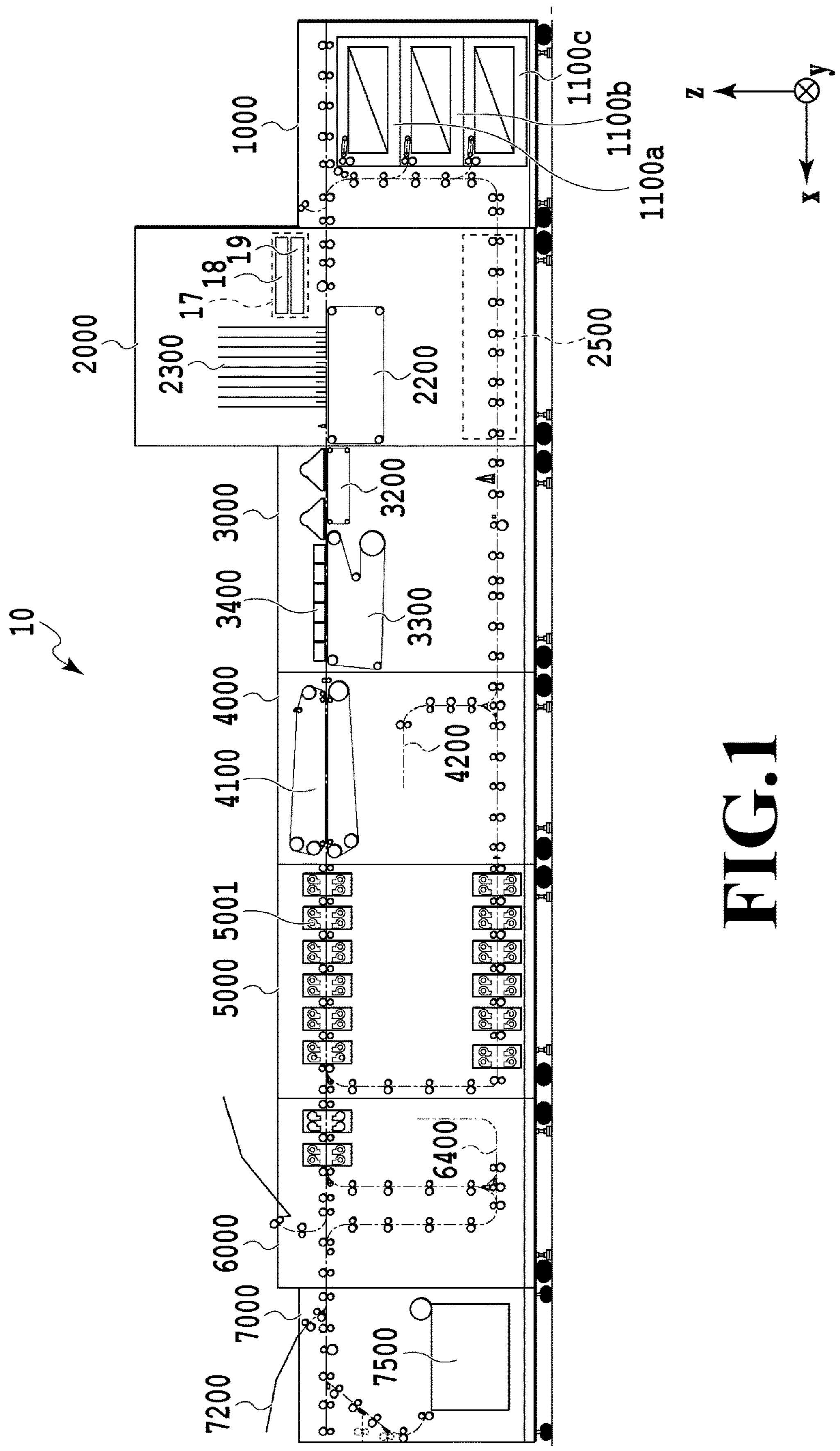
FIG. 1 is a schematic diagram showing an example rough configuration of a printing apparatus.

Preferred embodiments of the present disclosure are described in detail below with reference to the drawings attached hereto. Note that the embodiments below are not intended to limit the matters in the present disclosure, and not all the combinations of the features described in the embodiments below are necessarily essential as the solutions provided by the present disclosure. Note that the same reference number is used to denote the same constituent.

First Embodiment

<Overall Configuration of the Printing Apparatus>

An overall configuration of a printing apparatus 10 of the present embodiment is described below with reference to the drawings. Note that, in the drawings, arrows x and y represent horizontal directions that are orthogonal to each other, and an arrow z represents a vertical direction. An x-direction is a conveyance direction in which a sheet S as a printing medium is conveyed in the printing apparatus 10 as a whole, or is particularly a conveyance direction in which the sheet S is conveyed in a print unit 2300. Also, directions in FIG. 1 are defined as follows: an upper side of the apparatus as top, a direction from right to left is a longitudinal direction, and a direction from the near side on the paper plane to the far side on the paper plane, which is orthogonal to the sheet conveyance direction, is a sheet width direction, with the near side on the paper plane being an apparatus front side and the far side on the paper plane being an apparatus rear side.

FIG. 1 is a schematic diagram showing an example rough configuration of the printing apparatus 10. The printing apparatus 10 is a sheet printing apparatus that manufactures a printed object by forming an ink image on a sheet S using two types of liquid: reaction liquid and ink. The printing apparatus 10 of the present embodiment has a paper feed module 1000, a print module 2000, a drying module 3000, a fixation module 4000, a cooling module 5000, an inversion module 6000, and a paper discharge and stack module 7000. The sheet S in a cut paper shape supplied from the paper feed module 1000 is conveyed along a conveyance path, subjected to processes by the modules, and discharged to the paper discharge and stack module 7000.

In the paper feed module 1000, three storages 1100*a* to 1100*c* for housing sheets S are disposed. The storages 1100*a* to 1100*c* are each configured to be drawable to the apparatus front side (the near side on the paper plane). The sheets S are fed one at a time from each of the storages 1100*a* to 1100*c* by a separation belt and conveyance rollers and is conveyed to the print module 2000. Note that the present disclosure is not limited to having three storages 1100*a* to 1100*c* and may be configured having one or two storages or four or more storages.

The print module 2000 has a pre-image-formation registration correction unit (not shown), a print belt unit 2200, the print unit 2300, and a maintenance unit 17. The sheet S conveyed from the paper feed module 1000 is corrected in the sheet's tilt and position by the pre-image-formation registration correction unit and is conveyed to the print belt unit 2200. The print unit 2300 is disposed at a position facing the print belt unit 2200 across the conveyance path of the sheet S. The print unit 2300 forms an image on the sheet S conveyed thereto by performing a print process from above on the sheet S using a printhead 22 (see FIG. 2). The sheet S is given clearance from the printhead 22 by being suctioned onto and conveyed by the print belt unit 2200. Also, a plurality of the printheads 21 are arranged side by side in the conveyance direction (the x-direction).

The print unit 2300 of the present embodiment has a total of five line-type printheads 22 corresponding to four colors, Y (yellow), M (magenta), C (cyan), and Bk (black), and P (reaction liquid). Note that the number of types of liquid and the number of printheads are not limited to five. Examples of an inkjet method that can be employed include a method using heat generation elements, a method using piezoelectric elements, a method using electrostatic elements, and a method using MEMS elements. An ink of each color is supplied to the corresponding printhead 22 from an ink tank through an ink tube (neither shown).

The sheet S printed by the print unit 2300 is conveyed by the print belt unit 2200. The printed image can be corrected based on detection of displacement and color density of the image formed on the sheet S by an inline scanner (not shown) disposed downstream of the print unit 2300 in the conveyance direction.

The drying module 3000 has a decoupling unit 3200, a drying belt unit 3300, and a hot air blowing unit 3400. The drying module 3000 is a unit that decreases a liquid component included in the ink applied to the sheet S by the print unit 2300 to enhance the fixation between the sheet S and the ink. The sheet S printed in the print unit 2300 of the print module 2000 is conveyed to the decoupling unit 3200 disposed in the drying module 3000. In the decoupling unit 3200, the sheet S can be conveyed due to wind pressure from above and friction against the belt, and the sheet S is weakly held onto the belt to prevent displacement of the sheet S on the print belt unit 2200 where an ink image is formed. The sheet S conveyed from the decoupling unit 3200 is suctioned onto and conveyed by the drying belt unit 3300 and at the same time, receives hot air from the hot air blowing unit 3400 disposed above the belt. The ink application surface of the sheet S is thereby dried. Note that, as the drying method, the method using application of hot air may be combined with a method using application of electromagnetic waves (such as ultraviolet or infrared rays) to the surface of the sheet S or a heat conduction method bringing a heat generator into contact.

The fixation module 4000 has a fixation belt unit 4100. The fixation belt unit 4100 has an upper belt unit and a lower belt unit. The sheet S conveyed from the drying module 3000 is passed through between the heated upper and lower belt units, so that the ink can be fixed onto the sheet S.

The cooling module 5000 has a plurality of cooling units 5001. The cooling units 5001 cool the hot sheet S conveyed from the fixation module 4000 sheet S. The cooling units 5001 cool the sheet S by taking outside air into a cooling box using a fan to increase pressure inside the cooling box and blowing air discharged from nozzles formed in a conveyance guide against the sheet S. The cooling units 5001 are disposed at both sides of the conveyance path to be able to cool the sheet S from both sides. Also, the cooling module 5000 has a conveyance path switch unit thereinside to be able to switch the conveyance path of the sheet S depending on whether the sheet S is conveyed to the inversion module 6000 or conveyed to a double-side conveyance path used for double-sided printing. In double-sided printing, the sheet S is conveyed to a conveyance path below the cooling module 5000 and is further conveyed along the double-side conveyance path, which travels through the fixation module 4000, the drying module 3000, the print module 2000, and the paper feed module 1000. In the print module 2000, the sheet S is conveyed along a double-side conveyance path 2500. Then, the sheet S is conveyed through the pre-image-formation registration correction unit, the print belt unit 2200, and the print unit 2300 in the print module 2000 again and printed by the printing unit. A double-side conveyance unit of the fixation module 4000 is provided with an inversion unit 1 (4200) for inverting the sheet S upside down.

The inversion module 6000 has an inversion unit 2 (6400) and can invert the sheet S conveyed thereto upside down using the inversion unit 2 (6400) and can freely change which surface of the sheet S faces upward upon discharge.

The paper discharge and stack module 7000 has a top tray 7200 and a stacker 7500 and aligns and stacks the sheet S conveyed from the inversion module 6000.

The maintenance unit 17 is a unit including mechanisms for restoring the ejection performance of the printheads. Examples of such mechanisms include a capping mechanism that protects an ink ejection surface of the printhead 22, a wiper mechanism that wipes the ink ejection surface, and a suction mechanism that suctions ink in the printhead from the ink ejection surface using negative pressure. Also, the maintenance unit 17 is provided with driving mechanisms and rails (neither shown). Then, the maintenance unit 17 is configured to be able to reciprocate horizontally along the rails, and the maintenance unit 17 moves to a position immediately under the printheads in performing maintenance of the printheads 22 and moves to a position retracted from the position immediately under the printheads in not performing maintenance. The maintenance unit 17 has a capping tray 18 including capping mechanisms and a cleaning tray 19 including wiper mechanisms and suction mechanisms. The capping tray 18 and the cleaning tray 19 are configured to be able to reciprocate horizontally independently of each other using the driving mechanisms and the rails (neither shown). Note that, in capping the printheads 22 with the capping mechanisms, only the capping tray 18 may move, or the entire maintenance unit 17 including the cleaning tray 19 may move.

<Configuration of the Printhead>

Figure 2:
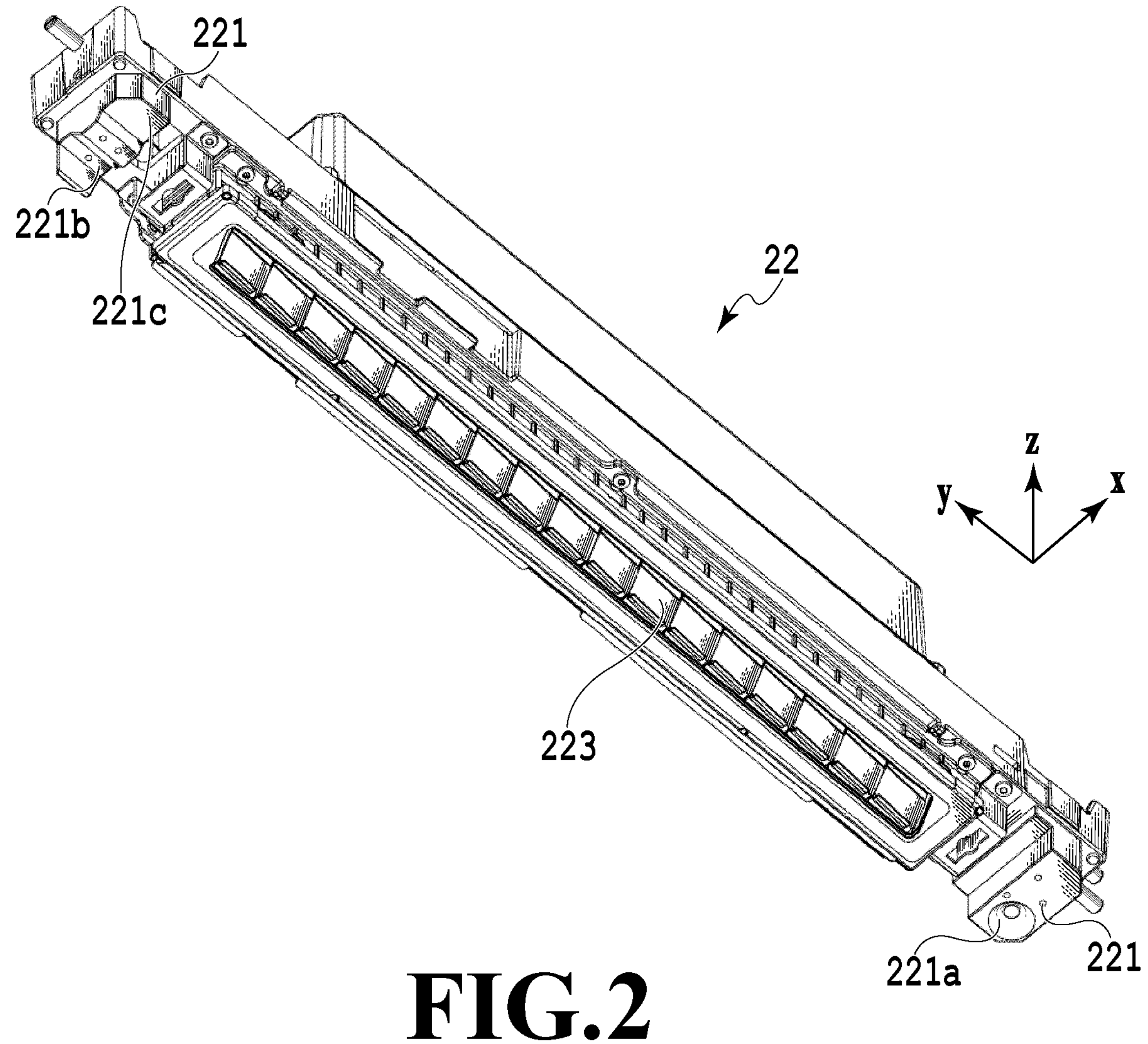
FIG. 2 is a perspective view of a printhead.

FIG. 2 is a perspective view of the printhead 22. As shown in FIG. 2, the printhead 22 has an array of nozzle plates 223 arranged in a longitudinal direction of the printhead (the sheet width direction or the y-direction), each nozzle plate 223 having a plurality of nozzles that eject ink. Positioning units 221 are provided at both ends of the printhead 22. Specifically, a first abutment portion 221*a* formed of a recess portion having a conical sloping surface is provided at the near side in the head longitudinal direction (the −y-direction side). Also, a second abutment portion 221*b* formed of a V-shape groove portion having two flat surfaces and a third abutment portion 221*c* formed of a flat surface portion are provided at the far side in the head longitudinal direction (the +y-direction side).

<Configuration of the Maintenance Unit>

Figure 3:
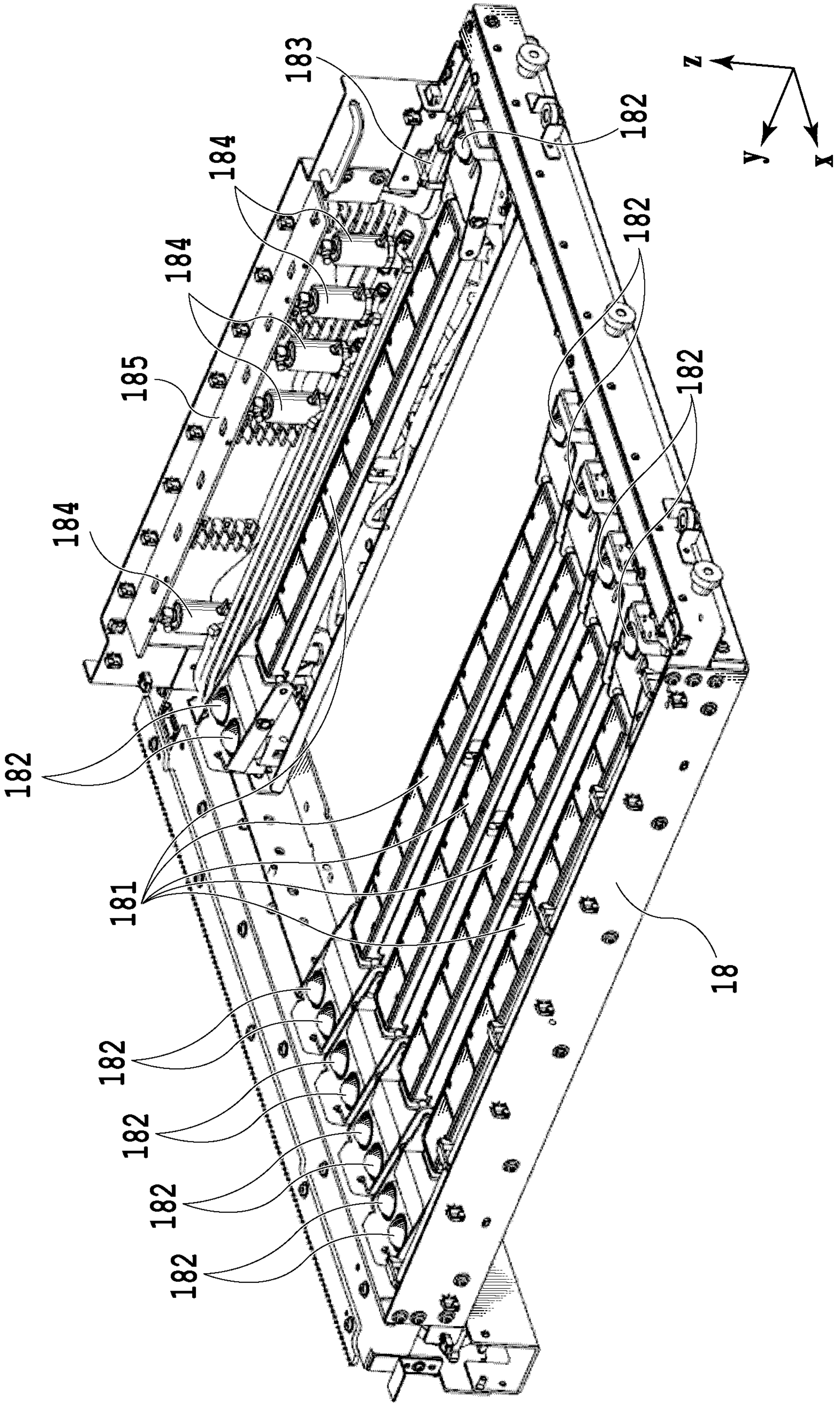
FIG. 3 is a perspective view showing the configuration of a capping tray.
Figure 4:
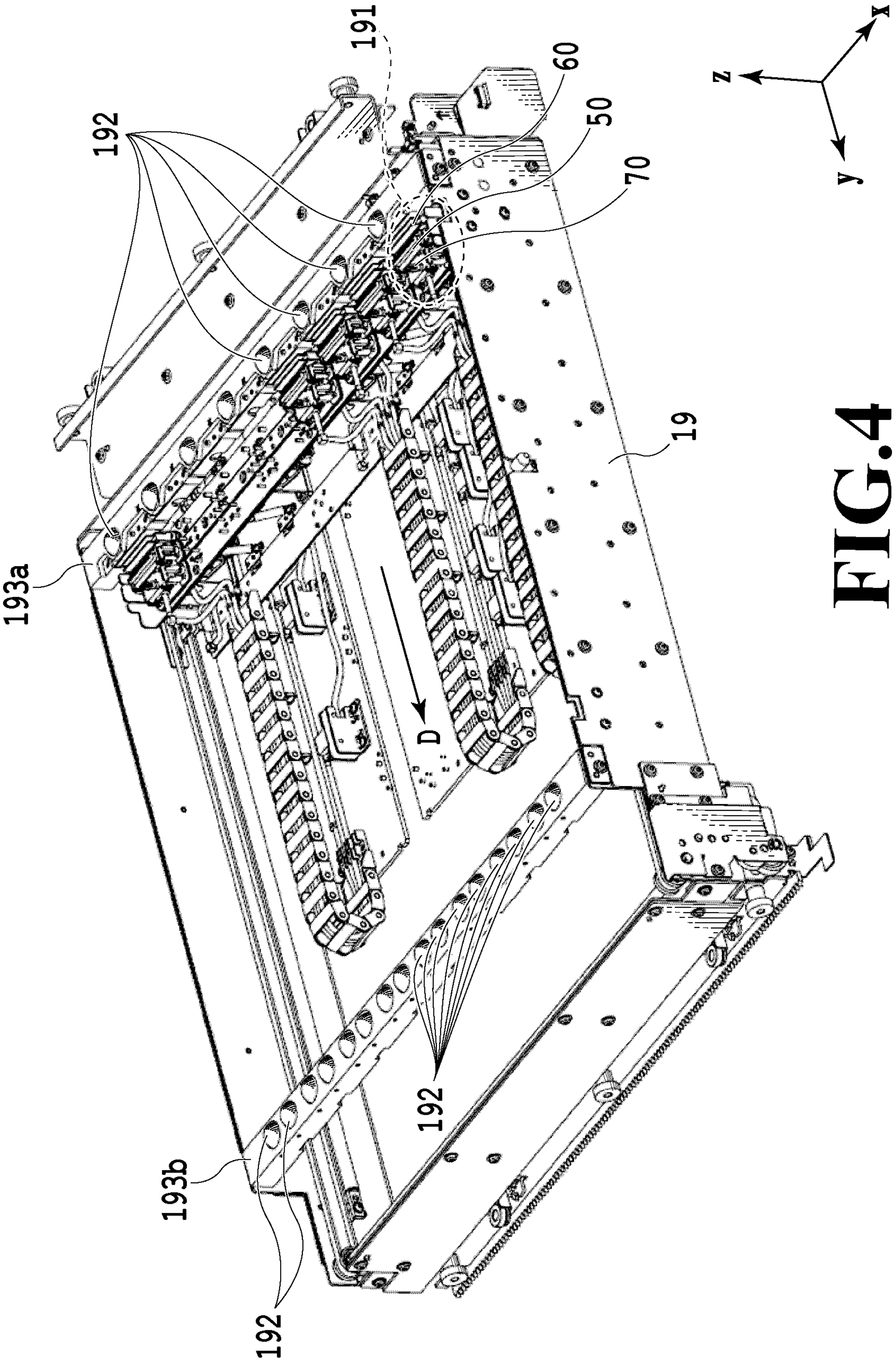
FIG. 4 is a perspective view showing the configuration of a cleaning tray.

FIG. 3 is a perspective view showing the configuration of the capping tray 18. FIG. 4 is a perspective view showing the configuration of the cleaning tray 19. The configuration of the maintenance unit 17 is described below with reference to FIGS. 3 and 4.

In the present embodiment, the maintenance unit 17 includes the capping tray 18 where capping mechanisms 181 (see FIG. 3) are disposed and the cleaning tray 19 where cleaning mechanisms 191 (see FIG. 4) are disposed. The capping tray 18 and the cleaning tray 19 are configured to be movable in the apparatus longitudinal direction (the x-direction) by a driving motor and a rail provided in the housing (neither shown). Note that, because there are a total of five printheads 22 in the present embodiment, a total of five capping mechanisms 181 and a total of five cleaning mechanisms 191 are provided in correspondence to the printheads 22.

As shown in FIG. 3, each capping mechanism 181 in the capping tray 18 has a plurality of spherical printhead positioning members 182 for determining the position of the printhead 22. The printhead positioning members 182 of the capping mechanism 181 are arranged at the front and the rear in the sheet width direction (the y-direction). Three printhead positioning members 182 are used to position one printhead 22 relative to the capping mechanism 181: one disposed on the near side (the −y-direction side) and two disposed on the far side (+y-direction side) of the capping mechanism 181. Positioning between the printhead 22 and the capping mechanism 181 is achieved by abutting the above-described positioning units 221 provided at both ends of the printhead 22 against the printhead positioning members 182 of the capping mechanism 181. By thus positioned relative to the printhead 22, the capping mechanism 181 can protect the nozzle plates 223 of the printhead 22 and perform negative pressure suction using a negative pressure suction mechanism to be described later.

As shown in FIG. 4, the cleaning tray 19 has a plurality of spherical printhead positioning members 192 for positioning the plurality of printheads 22. In the cleaning tray 19, the printhead positioning members 192 are arranged at the front and the rear in the sheet width direction (the y-direction) and are held by beam members 193*a*, 193*b* disposed extending in the sheet conveyance direction (the x-direction). Three printhead positioning members 192 are provided and used to position one printhead 22 relative to the cleaning tray 19. In the cleaning tray 19, one printhead positioning member 192 is disposed at the near-side beam member 193*a* (the −y-direction side), and two printhead positioning members 192 are disposed at the far-side beam member 193*b* (the +y-direction side). Positioning between the printhead 22 and the cleaning tray 19 is achieved by abutting the above-described positioning units 221 provided at both ends of the printhead 22 against the printhead positioning members 192 of the cleaning tray 19.

Note that the configuration for positioning is not limited to one that uses spherical positioning members, and a configuration in which part of the printhead 22 is brought into abutment against the inside of the cleaning tray 19 may be employed. Alternatively, the positioning configuration may be one that uses holes and pins provided at the cleaning tray 19 and the printhead 22.

As described earlier, five cleaning mechanisms 191 are provided at the cleaning tray 19 to correspond to the number of printheads 22. Each cleaning mechanism 191 has a cleaning liquid application unit 50, a liquid removal unit 60, and a negative pressure application unit 70. The cleaning liquid application unit 50 is an application unit that applies cleaning liquid to the nozzle plates 223 of the printhead 22. The liquid removal unit 60 is a wiper mechanism for removing ink, paper dust, and cleaning liquid attached to the nozzle plates 223 of the printhead 22. The negative pressure application unit 70 is a suction mechanism for applying negative pressure to the nozzle plates 223 of the printhead 22 to remove ink solidified and attached to nozzle units, and also to remove bubbles in the ink flow channels. The cleaning tray 19 has a moving mechanism (not shown) that moves the cleaning mechanisms 191 in a wiping direction D orthogonal to the sheet conveyance direction (the x-direction) as shown in FIG. 4. The cleaning mechanism 191 removes ink and dust on the nozzle surface of the printhead 22 using a combination of the cleaning liquid application unit 50, the liquid removal unit 60, and the negative pressure application unit 70.

<Flow Channel Configuration>

Figure 5:
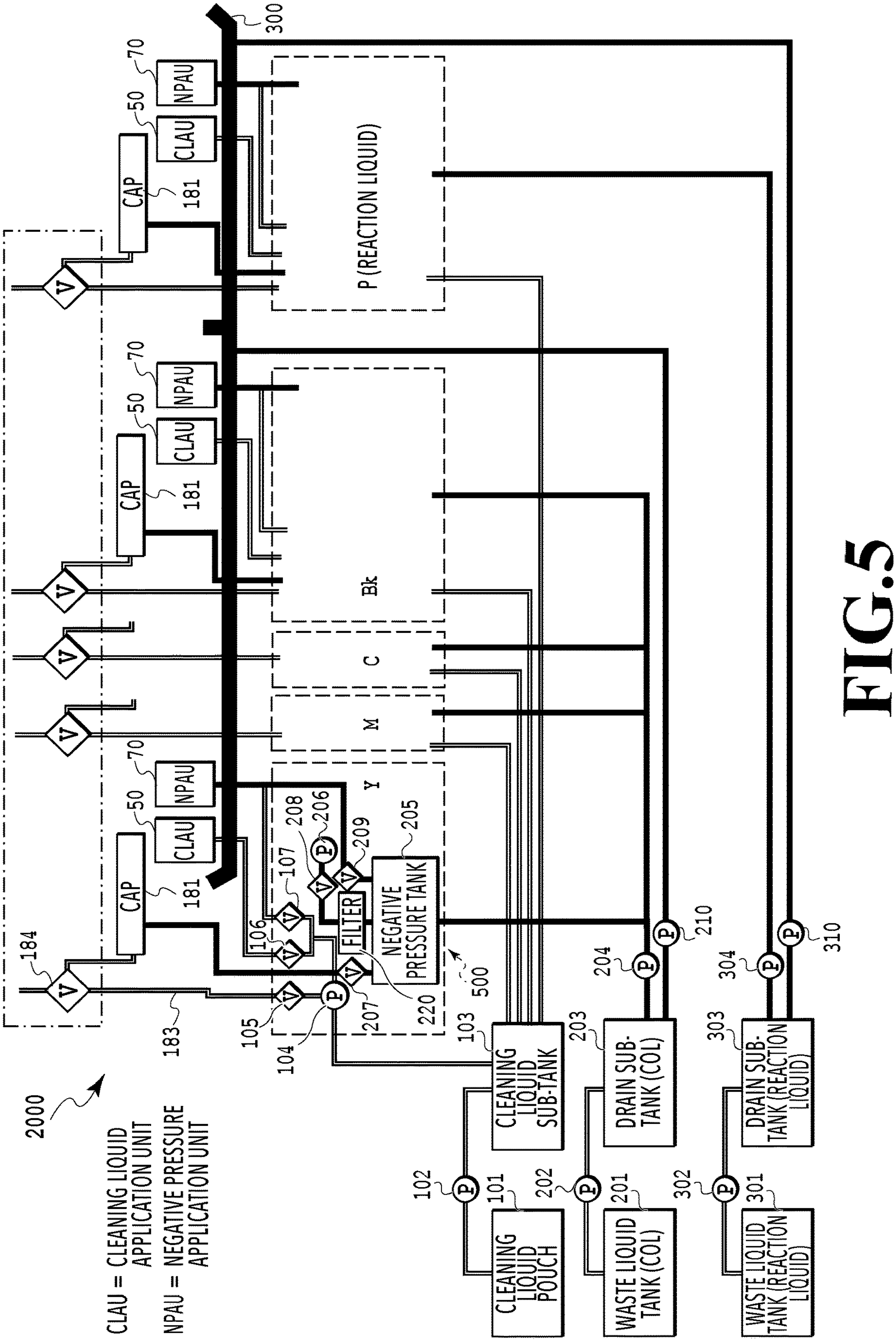
FIG. 5 is a diagram showing a flow channel configuration in a print module.

FIG. 5 is a diagram showing a flow channel configuration in the print module 2000 of the present embodiment. FIG. 5 is used to describe cleaning liquid supply channels, negative pressure suction flow channels, and waste liquid flow channels. All the configurations shown in FIG. 5 are provided in the print module 2000. Cleaning liquid and negative pressure supply units 500 are provided for the respective printheads 22. For the sake of simplicity, FIG. 5 shows the internal configuration of only the cleaning liquid and negative pressure supply unit 500 for yellow. Similarly, while the capping mechanism 181, the cleaning liquid application unit 50, and the negative pressure application unit 70 are provided for each printhead 22, FIG. 5 shows configurations only for some of the printheads 22 for the sake of simplicity. The cleaning liquid and negative pressure supply unit 500 has a cleaning liquid supply pump 104, on-off valves 105 to 107, a negative pressure tank 205, a negative pressure suction pump 206, on-off valves 207 to 209, and a filter 220.

Cleaning liquid is delivered from a cleaning liquid pouch 101 to a cleaning liquid sub-tank 103 by a liquid delivery pump 102, the cleaning liquid pouch 101 being a storage tank for storing the cleaning liquid. Each of the cleaning liquid and negative pressure supply units 500 (Y, M, C, Bk, P) for the respective printheads 22 is provided with the cleaning liquid supply pump 104. By the cleaning liquid supply pump 104, the cleaning liquid can be delivered from the cleaning liquid sub-tank 103 to the capping mechanism 181, the cleaning liquid application unit 50, and the negative pressure application unit 70 for the corresponding printhead 22. For instance, the cleaning liquid in the cleaning liquid sub-tank 103 can be delivered by the cleaning liquid supply pump 104 for Y to the capping mechanism 181, the cleaning liquid application unit 50, and the negative pressure application unit 70 corresponding to the printhead 22 for Y.

Also, timing to supply the cleaning liquid to the capping mechanism 181, the cleaning liquid application unit 50, and the negative pressure application unit 70 can be controlled using the on-off valves 105 to 107 in the cleaning liquid and negative pressure supply unit 500.

Application of negative pressure to the capping mechanism 181 and the negative pressure application unit 70 is done by the negative pressure suction pump 206 connected to the negative pressure tank 205. Negative pressure can be applied to the capping mechanism 181 and the negative pressure application unit 70 via the negative pressure tank 205, using the on-off valves 207 to 209 provided. Because the cleaning liquid and negative pressure supply unit 500 is provided for each printhead 22, the application of negative pressure to the printheads 22 can also be performed independently of each other.

Waste liquid suctioned from the printhead 22 as a result of negative pressure suction of the capping mechanism 181 and the negative pressure application unit 70 is housed from the negative pressure tank 205 into a drain sub-tank 203, which is a storage tank for storing waste liquid, by a first discharge pump 204. Then, the waste liquid is further stored in a waste liquid tank 201 by a second discharge pump 202.

Also, a collection tray 300 is provided to collect cleaning liquid overflowing from the cleaning liquid application units 50. The cleaning liquid collected by the collection tray 300 is delivered to the drain sub-tank 203 by a third discharge pump 210.

Once the amount of waste liquid in the waste liquid tank 201 nears the upper-limit capacity, a waste liquid tank detection sensor (not shown) detects this and urges a user to replace the waste liquid tank 201.

Note that waste liquid from the head for reaction liquid (P) is housed in a drain sub-tank 303 for the reaction liquid by a fourth discharge pump 304, separately from the waste liquid flow channels for the color ink heads (COL: Y to Bk). The waste liquid from the head for reaction liquid (P) is then stored in a waste liquid tank 301 for the reaction liquid by a fifth discharge pump 302. Also, the collection tray 300 is partitioned between the reaction liquid head and the color ink heads, and the cleaning liquid used for the reaction liquid head and collected by the collection tray 300 is delivered to the drain sub-tank 303 by a sixth discharge pump 310. Thus, the reaction liquid (P) and the color inks (Y to Bk) do not mix in the waste flow channels, which helps prevent the inks from solidifying and attaching to the flow channels and clogging the flow channels. Note that the configuration of the collection tray 300 is not limited to the above, and separate trays may be provided for the color inks (Y to Bk) and the reaction liquid (P).

In the flow channel configuration as thus described above, the cleaning liquid and negative pressure supply units 500 (Y, M, C, Bk, P) are provided for the respective heads. Each cleaning liquid and negative pressure supply unit 500 is provided with the cleaning liquid supply pump 104 and the on-off valves 105 to 107 for controlling supply of the cleaning liquid to each flow channel. Each cleaning liquid and negative pressure supply unit 500 is also provided with the negative pressure tank 205, the negative pressure suction pump 206 for negative pressure suction, and the on-off valves 207 to 209 for controlling application of negative pressure to each unit. In this way, in the present embodiment, necessary electronic devices and on-off valves are unitized for each of the cleaning liquid and negative pressure supply units 500 (Y, M, C, Bk, P) for the respective printheads.

<Configuration of the Cleaning Liquid and Negative Pressure Supply Unit>

Figure 6:
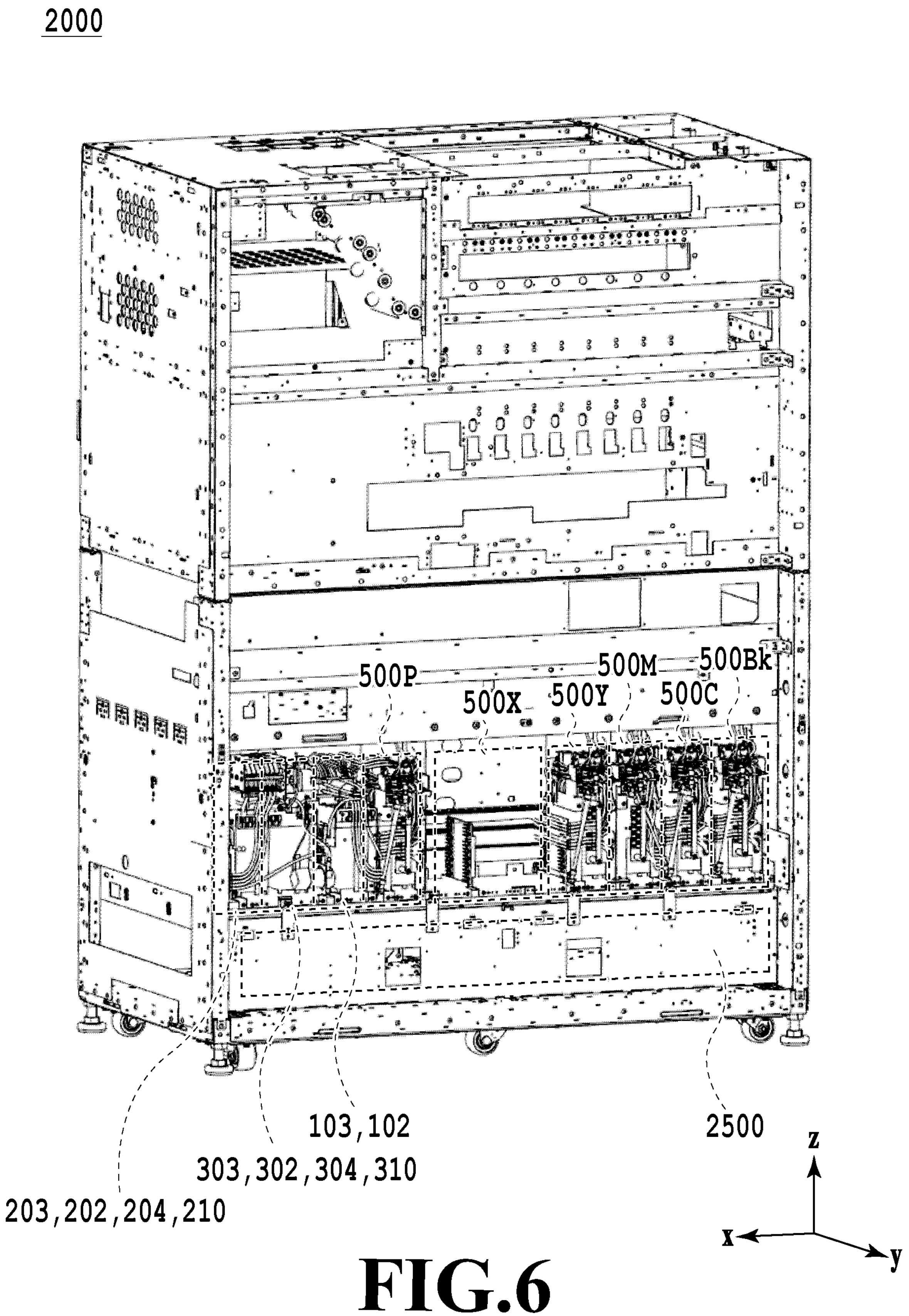
FIG. 6 is a diagram showing the print module from the back side of the apparatus.
Figure 7:
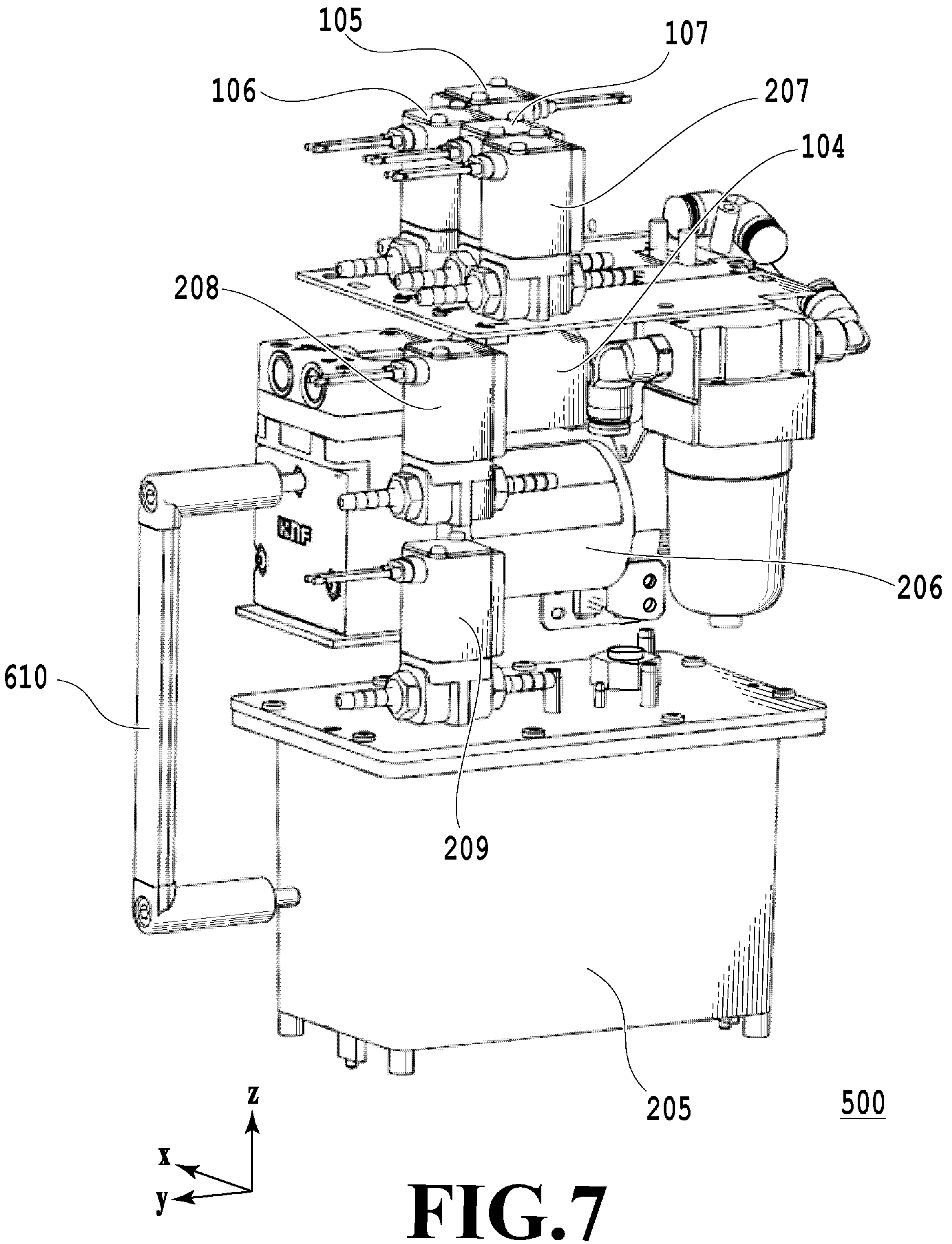
FIG. 7 is a perspective view showing a cleaning liquid and negative pressure supply unit.
Figure 8:
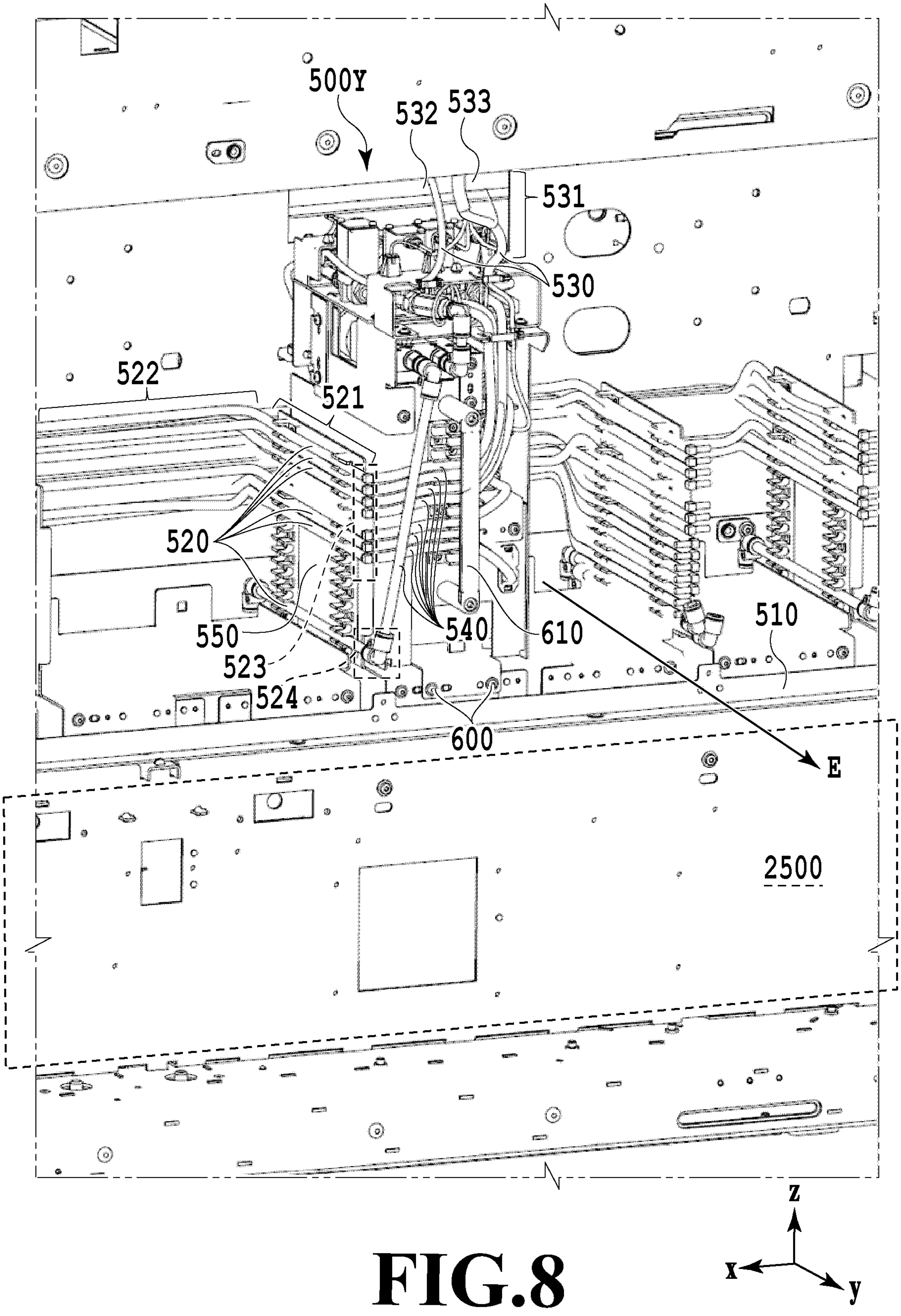
FIG. 8 is a diagram illustrating detachment of the cleaning liquid and negative pressure supply unit.

Next, the configuration of the cleaning liquid and negative pressure supply unit 500 of the present embodiment is described using FIGS. 6, 7, and 8.

FIG. 6 is a view of the print module 2000 in FIG. 1 seen from the apparatus's back side (the +y-direction side). As shown in FIG. 6, the unitized cleaning liquid and negative pressure supply units 500 (Y, M, C, Bk, P) are disposed at a lower part of the apparatus's back side of the print module 2000. Similarly, the cleaning liquid sub-tank 103 and the liquid delivery pump 102 as well as the drain sub-tank 203, the second discharge pump 202, the first discharge pump 204, and the third discharge pump 210 are disposed at a lower part of the apparatus's back side of the print module 2000. Similarly, the drain sub-tank 303, the fifth discharge pump 302, the fourth discharge pump 304, and the sixth discharge pump 310 for the reaction liquid are disposed at a lower part of the apparatus's back side of the print module 2000. These are arranged roughly side by side in the longitudinal direction of the print module 2000.

Note that there is a space 500X provided between the cleaning liquid and negative pressure supply unit 500P and the cleaning liquid and negative pressure supply unit 500Y. The space 500X is a space where an additional cleaning liquid and negative pressure supply unit can be disposed in a case when there are more than five printheads 22, i.e., more than the number of printheads 22 in the present embodiment. Also, under these cleaning liquid and negative pressure supply units 500 (Y, M, C, Bk, P), there is a space where the double-side conveyance path 2500 (FIG. 1) along which a sheet S is conveyed in double-sided printing is disposed.

FIG. 7 is a perspective view showing the cleaning liquid and negative pressure supply unit 500. FIG. 7 shows the arrangement of the negative pressure tank 205 and various pumps disposed inside the cleaning liquid and negative pressure supply unit 500. As shown in FIG. 7, in each cleaning liquid and negative pressure supply unit 500, the negative pressure tank 205 is disposed at a lower location of the unit in a direction of gravitational force. Then, the cleaning liquid supply pump 104, the negative pressure suction pump 206, the on-off valves 105 to 107, and the on-off valves 207 to 209 are disposed above the negative pressure tank 205. In other words, the cleaning liquid supply pump 104 and the negative pressure suction pump 206, which are electronic components, are disposed at higher locations than the negative pressure tank 205 in the direction of gravitational force. For this reason, should liquid leakage occur from the negative pressure tank 205 storing ink or reaction liquid, there is less risk of the ink or reaction liquid touching and breaking these electronic components. Also, the cleaning liquid and negative pressure supply unit 500 is provided with an attachment/detachment handle 610 at the back side (+y-direction side) of the print module 2000. As will be described later, a user can pull the cleaning liquid and negative pressure supply unit 500 out of the print module 2000 using the attachment/detachment handle 610.

FIG. 8 is a diagram illustrating detachment of the cleaning liquid and negative pressure supply unit 500. FIG. 8 shows a state where the cleaning liquid and negative pressure supply unit 500Y is disposed in the apparatus's main body of the print module 2000, while the adjacent cleaning liquid and negative pressure supply unit 500M and cleaning liquid and negative pressure supply unit 500C are detached.

First liquid tubes 520 connected to the cleaning liquid and negative pressure supply unit 500Y extend along a side surface (521) of the cleaning liquid and negative pressure supply unit 500Y to a back part (522) of the apparatus's main body and are then connected to the connection destination. The first liquid tubes 520 are flow channels connecting the cleaning liquid sub-tank 103 shown in FIG. 5 and the cleaning liquid and negative pressure supply unit 500 to each other and flow channels connecting the cleaning liquid and negative pressure supply units 500 and the drain sub-tank 203 to each other. Note that the flow channels in FIG. 5 are schematically shown. In the example in FIG. 8, four first liquid tubes 520 are provided to supply cleaning liquid to the cleaning liquid and negative pressure supply unit 500.

Also, three suction tubes are provided to discharge cleaning liquid and ink suctioned by the cleaning liquid and negative pressure supply unit 500, and one first liquid tubes 520 is provided as a discharge flow channel for the negative pressure suction pump 206.

In this way, in the example in FIG. 8, eight first liquid tubes 520 are connected to the cleaning liquid and negative pressure supply unit 500Y. Note that, in the example in FIG. 8, liquid tubes are similarly provided for the detached cleaning liquid and negative pressure supply units 500 for magenta and cyan. Tube joints 523, 524 are provided at the tips of the first liquid tubes 520. As shown in FIG. 8, the eight first liquid tubes 520 connected to the cleaning liquid and negative pressure supply unit 500 are all configured extending along the back part (522) of the apparatus's main body and the side surface (521) of the cleaning liquid and negative pressure supply unit 500. Also, at the back part of the cleaning liquid and negative pressure supply unit 500, second liquid tubes 540 are provided and connected to the respective tube joints 523, 524. These second liquid tubes 540 are, as described earlier, connected to the negative pressure tank 205, the various pumps, the various on-off valves, and the like, disposed inside the cleaning liquid and negative pressure supply unit 500.

The first liquid tubes 520 are held by a holding member 550 extending from the back part 522 of the main body toward the back side (the +y-direction side). The holding member 550 is configured to be able to hold the first liquid tubes 520 for two cleaning liquid and negative pressure supply units 500. Note that the holding member 550 denoted by a reference numeral in FIG. 8 only has the first liquid tubes 520 for a single cleaning liquid and negative pressure supply unit 500 in FIG. 8, and the liquid tubes for a cleaning liquid and negative pressure supply unit 500 added to the space 500X will be disposed on the holding member 550. The cleaning liquid and negative pressure supply unit 500 and the holding member 550 including the first liquid tubes 520 and the tube joints 523, 524 are disposed so as not to overlap with each other in a view from the apparatus's back side (the +y-direction side). For this reason, in a state where the second liquid tubes 540 are disconnected from the tube joints 523, 524, the holding member 550 and the tube joints 523, 524 do not interfere with detachment of the cleaning liquid and negative pressure supply unit 500 in the detachment direction (arrow E).

Further, at an upper surface (531) of the cleaning liquid and negative pressure supply unit 500Y, wire harnesses 530 for connection of the electronic components of the cleaning liquid and negative pressure supply unit 500Y are connected to the apparatus's main body via electrical connectors 532, 533.

In order for a user to detach the cleaning liquid and negative pressure supply unit 500Y from the apparatus's main body, the user disconnects the tube joints 523, 524 at the side surface (521) of the cleaning liquid and negative pressure supply unit 500Y. Also, the user disconnects the electrical connectors 532, 533 at the upper surface (531) of the cleaning liquid and negative pressure supply unit 500Y. The liquid connection and electrical connection between the cleaning liquid and negative pressure supply unit 500Y and the apparatus's main body are thereby easily disconnected. Further, at the near side (the apparatus's back side) of the cleaning liquid and negative pressure supply unit 500Y, the user removes screws 600 securing the cleaning liquid and negative pressure supply unit 500Y to the apparatus's main body. Then, the user can detach the cleaning liquid and negative pressure supply unit 500Y from the apparatus's main body by holding and pulling the attachment/detachment handle 610 in the direction of arrow E (to the apparatus's back side). In this regard, the first liquid tubes 520 and the wire harnesses 530 connected to the cleaning liquid and negative pressure supply unit 500Y are disposed at positions not interfering with the detachment in the detachment direction (arrow E) of the cleaning liquid and negative pressure supply unit 500. Specifically, the first liquid tubes 520 and the wire harnesses 530 are disposed at the back part (522) of the apparatus's main body and at the side surface (521) and the upper surface (531) of the cleaning liquid and negative pressure supply unit 500. In other words, in a case when the direction of detaching the cleaning liquid and negative pressure supply unit 500 from the apparatus's main body is the front, the first liquid tubes 520 and the wire harnesses 530 are connected to the cleaning liquid and negative pressure supply unit 500 at locations except for the front side of the cleaning liquid and negative pressure supply unit 500. Thus, the first liquid tubes 520 and the wire harnesses 530 do not interfere with detachment of the cleaning liquid and negative pressure supply unit 500, and the cleaning liquid and negative pressure supply unit 500 can be detached easily.

Note that a liquid leakage prevention tray 510 is disposed below the cleaning liquid and negative pressure supply units 500. A leakage detection sensor (not shown) is disposed inside the liquid leakage prevention tray 510. As shown in FIG. 8, the liquid leakage prevention tray 510 is provided in such a manner as to cover the entire lower surfaces of all the cleaning liquid and negative pressure supply units 500. Thus, should liquid leakage occur from any of the negative pressure tanks 205 storing ink or reaction liquid, leaked ink or reaction liquid is caught by the liquid leakage prevention tray 510. Further, liquid in the liquid leakage prevention tray 510 can be detected by the leakage detection sensor (not shown), and, upon detection of liquid, the leakage can be handled appropriately by. e.g., stopping the apparatus immediately. This helps prevent ink or reaction liquid from leaking to the double-side conveyance path 2500 disposed at a location lower than the part where the cleaning liquid and negative pressure supply units 500 are disposed.

Note that the locations of the connection of the first liquid tubes 520 and the wire harnesses 530 to the cleaning liquid and negative pressure supply unit 500 are not limited to the side surface part and the upper surface part of the cleaning liquid and negative pressure supply unit 500, and may be, for example, the lower surface part. In other words, the connection of the first liquid tubes 520 and the wire harnesses 530 to the cleaning liquid and negative pressure supply unit 500 may be at other locations as long as they are located at positions except for the front side of the cleaning liquid and negative pressure supply unit 500 in a case when the direction in which the cleaning liquid and negative pressure supply unit 500 is detached from the apparatus's main body is the front. This makes it possible to easily detach the cleaning liquid and negative pressure supply unit 500 without interference of detachment of the cleaning liquid and negative pressure supply unit 500.

In this way, the printing apparatus of the present embodiment makes it easy for a user to perform maintenance work on the members. In the printing apparatus of the present embodiment, the cleaning liquid supply pump 104, the on-off valves 105 to 107, the negative pressure tank 205, the negative pressure suction pump 206, and the on-off valves 207 to 209 are all unitized into the cleaning liquid and negative pressure supply unit 500. In other words, unitized bodies of the cleaning liquid supply pump, the negative pressure suction pump, the negative pressure tank, the on-off valves, and the like, respectively corresponding to the cleaning configurations of the printheads can be detached from the apparatus's main body on a unit by unit basis. Thus, a part corresponding to a cleaning configuration for each head can easily be detached to perform replacement work or maintenance work. Further, the liquid tubes and the wire harnesses are not disposed on the detachment direction (arrow E). Specifically, the first liquid tubes 520 and the wire harnesses 530 connected to the cleaning liquid and negative pressure supply unit 500 are connected at such locations as not to interfere with the detachment of the cleaning liquid and negative pressure supply unit 500 in the detachment direction (arrow E). For this reason, the cleaning liquid and negative pressure supply unit 500 can be easily detached for maintenance work.

<Configuration of a Three-Way Valve in a Cap Liquid Supply Flow Channel>

Figure 9:
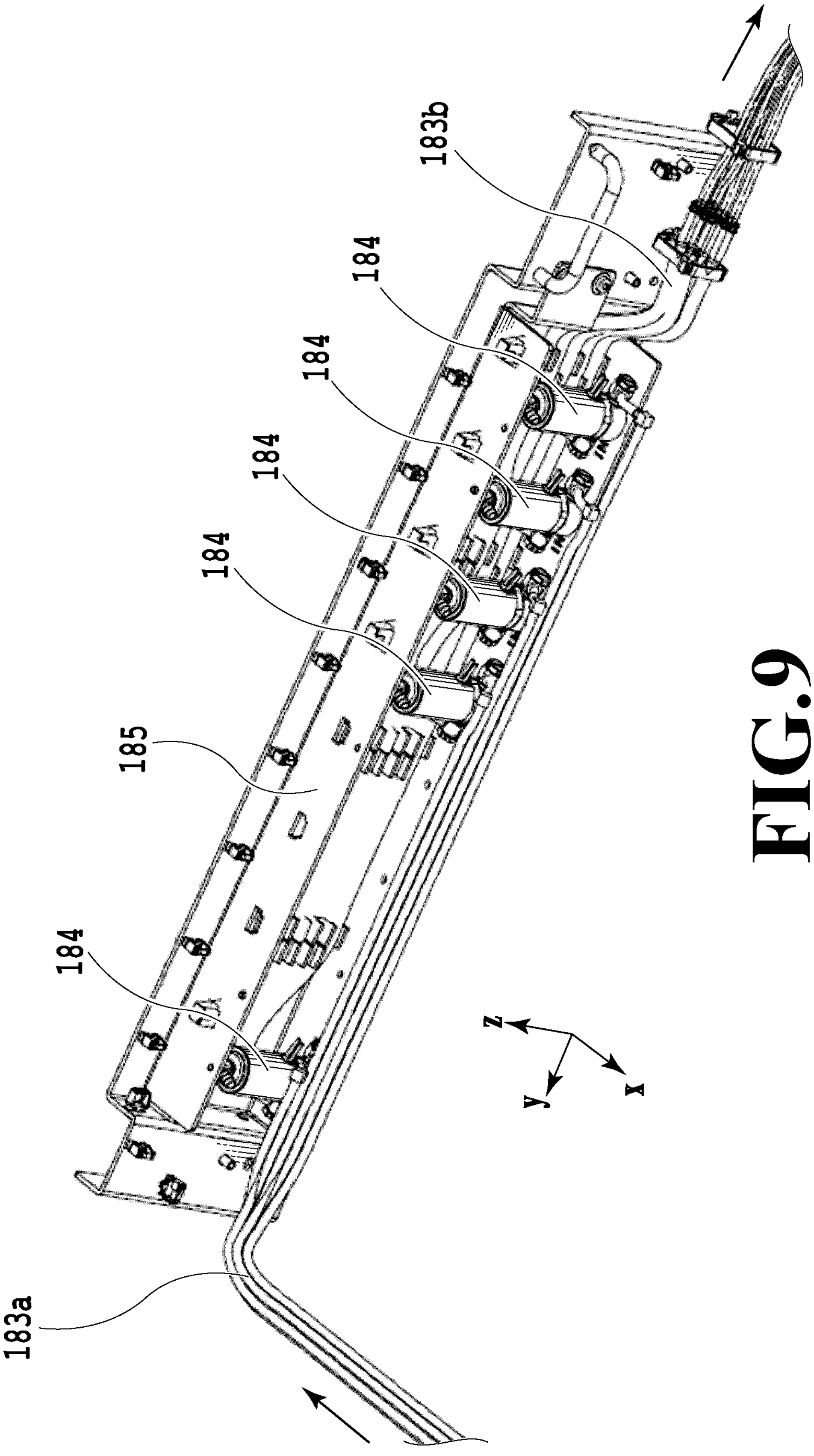
FIG. 9 is a perspective view of cap liquid supply flow channels of the capping tray.
Figure 10:
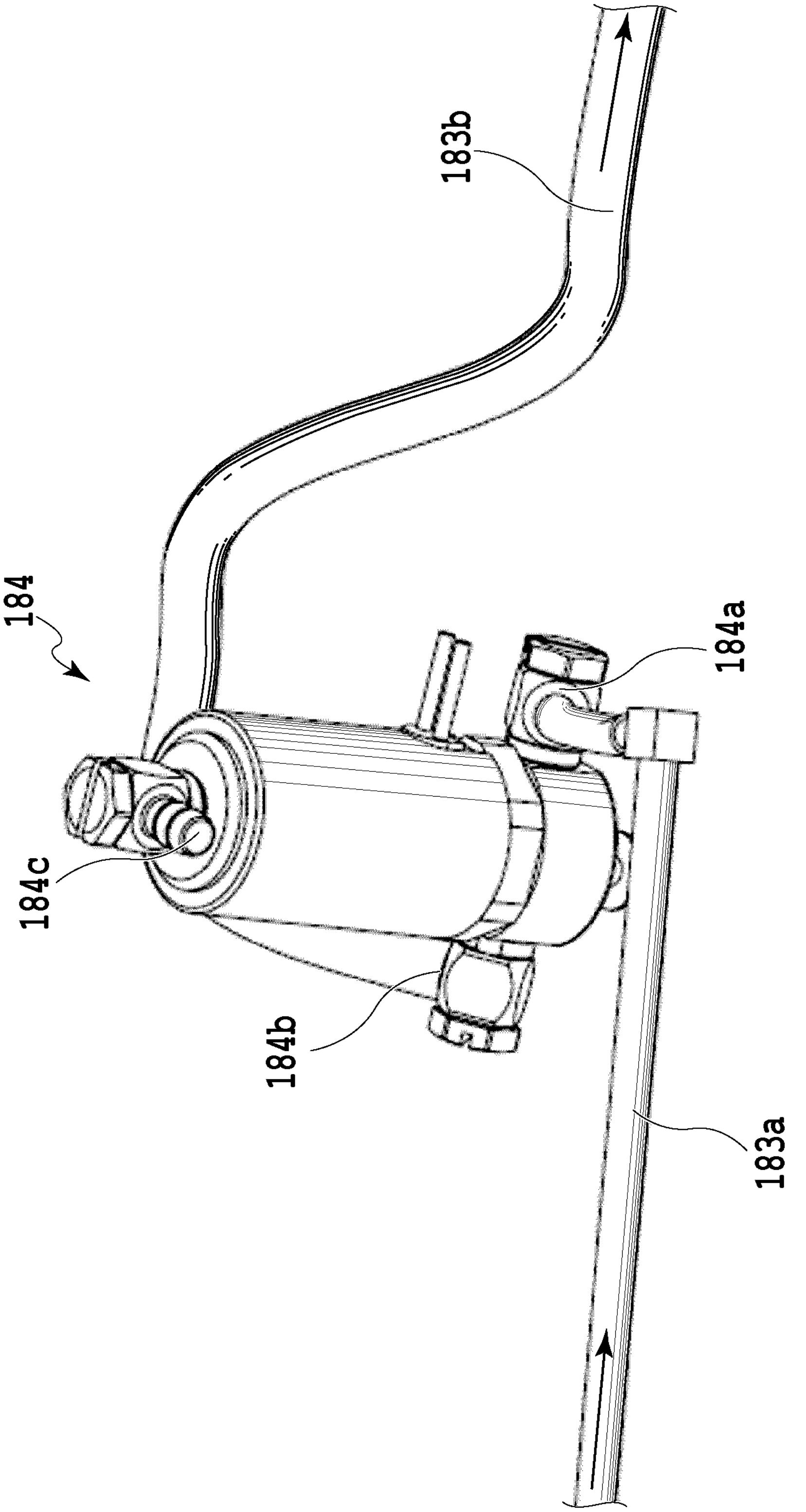
FIG. 10 is a perspective view of a cap upstream three-way valve.
Figure 11:
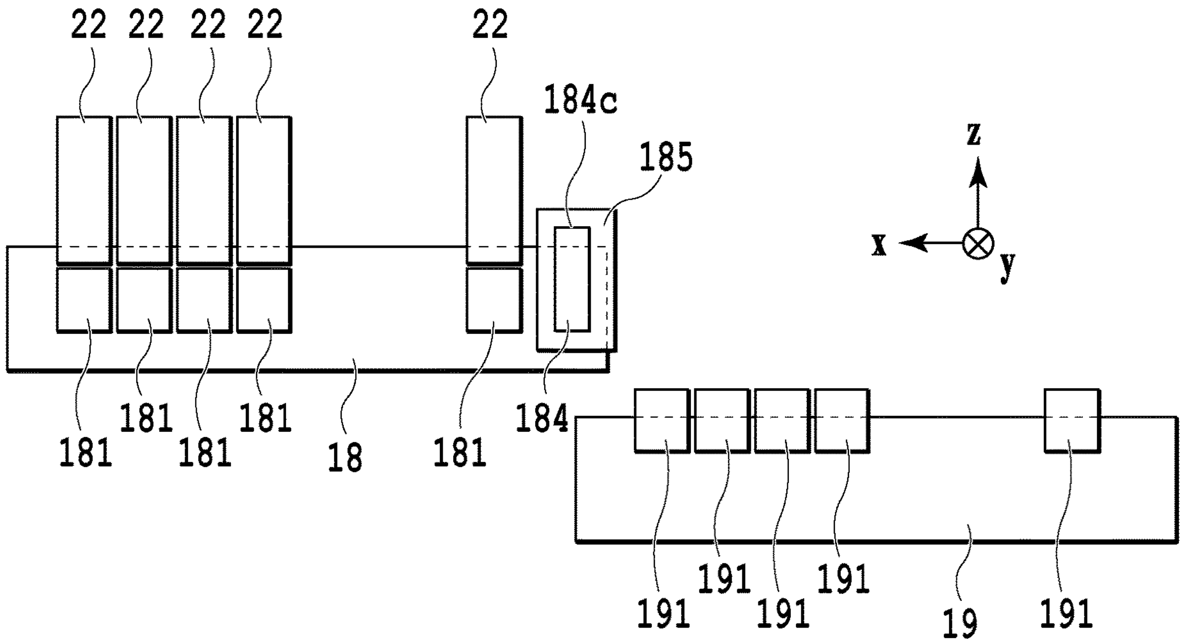
FIG. 11 is a diagram showing the arrangement of the cap upstream three-way valves and a three-way valve support member.

Next, the configuration of a three-way valve in a cap liquid supply flow channel for supplying cleaning liquid to the capping mechanism 181 in the present embodiment is described using FIGS. 9, 10, and 11.

FIG. 9 is a perspective view of a cap liquid supply flow channel 183 in the capping tray 18 as a cap support member. Specifically, FIG. 9 is an extraction of members of the capping tray 18 in FIG. 3 that are related to the cap liquid supply flow channel 183. As shown in FIGS. 3 and 9, the cap liquid supply flow channels 183 for the capping mechanisms 181 corresponding to the respective printheads 22 include a plurality of cap upstream three-way valves 184 and has flow channels 183*a* upstream of the three-way valves and flow channels 183*b* downstream of the three-way valves. Because five printheads 22 are provided in the present embodiment, there are also five cap upstream three-way valves 184 corresponding to the printheads 22. Then, flow channels upstream of the cap upstream three-way valves 184 (on the cleaning liquid sub-tank 103 side) are the flow channels 183*a* upstream of the three-way valves, and flow channels downstream are the flow channels 183*b* downstream of the three-way valves. The plurality of cap upstream three-way valves 184 are supported by a three-way valve support member 185 using a securing method (not shown).

FIG. 10 is a perspective view of the cap upstream three-way valve 184. As shown in FIG. 10, the cap upstream three-way valve 184 has a three-way valve entry 184*a*, a three-way valve supply exit 184*b*, and a three-way atmosphere communication port 184*c*. The three-way valve entry 184*a* is connected to the flow channel 183*a* upstream of the three-way valves, and the three-way valve supply exit 184*b* is connected to the flow channel 183*b* downstream of the three-way valves. The cap upstream three-way valve 184 is configured to be switchable between a cap supply state and a cap atmosphere communication state. The cap supply state is a state where the three-way valve entry 184*a* and the three-way valve supply exit 184*b* are connected to each other and the three-way atmosphere communication port 184*c* is closed. The cap atmosphere communication state is a state where the three-way valve entry 184*a* is closed and the three-way valve supply exit 184*b* and the three-way atmosphere communication port 184*c* are connected to each other.

In the cap supply state, the flow channel 183*a* upstream of the three-way valves and the flow channel 183*b* downstream of the three-way valves are connected to each other, allowing cleaning liquid to be supplied from the cleaning liquid supply pump 104 to the capping mechanism 181. In the cap atmosphere communication state, the flow channel 183*b* downstream of the three-way valves and the three-way atmosphere communication port 184*c* are connected to each other, allowing the inside of the capping mechanism 181 to be released to the atmosphere. Because the negative pressure in the capping mechanism 181 can thus be released after the printhead 22 is suctioned by the capping mechanism 181 and the negative pressure application unit 70 using negative pressure, load of an operation for moving the capping mechanism 181 away from the printhead 22 can be reduced.

FIG. 11 is a diagram showing the arrangement of the cap upstream three-way valves 184 and the three-way valve support member 185. FIG. 11 is a schematic view seen from the apparatus's front side. As shown in FIGS. 3 and 11, in the cap tray 18, the three-way valve support member 185 is disposed at one end of the printing apparatus. Specifically, the three-way valve support member 185 is disposed at a right end portion of the capping tray 18 in the longitudinal direction (the −x-direction side). Thus, with the printheads 22 being capped by the capping mechanisms 181, a space is formed at one end side, which makes it possible to attach/detach the three-way valve support member 185 and to perform maintenance work on the cap upstream three-way valves 184. Thus, with the printheads 22 being capped, various kinds of maintenance can be performed on the three-way valve support member 185 in the capping tray 18.

Also, as described earlier, the capping tray 18 and the cleaning tray 19 are configured as the maintenance unit 17. As shown in FIG. 11, with the printheads 22 being capped by the capping mechanisms 181, a space is formed at a location above the cleaning tray 19 and lateral to the capping tray 18 horizontally on the cap upstream three-way valves 184 side. This makes it easy to perform maintenance work on the cleaning mechanism 191 as well.

Also, as shown in FIG. 11, the cap upstream three-way valves 184 are disposed so that the three-way atmosphere communication ports 184*c* are located higher than the capping surfaces of the capping mechanisms 181 capping the printheads 22. This makes it possible to avoid a situation where upon release of the negative pressure inside the capping mechanisms 181 from the three-way atmosphere communication ports 184*c*, ink or cleaning liquid remaining in the flow channel 183*b* downstream of the three-way valves spills from the three-way atmosphere communication ports 184*c*.

Although the three-way valve support member 185 is disposed at the right end portion of the capping tray 18 in the apparatus longitudinal direction (an end portion at the −x-direction side) in the present embodiment, the three-way valve support member 185 may be disposed at an end portion of the capping tray 18 at the apparatus front side (the −y-direction). In that case, the size of the capping tray 18 needs to be extended in the apparatus front direction, but can be reduced in the apparatus rightward direction.

As thus described, the present disclosure can make it easy for a user to perform maintenance work on members.

Other Embodiments

In the example shown in FIG. 8 described above, at the back part of the cleaning liquid and negative pressure supply unit 500, the second liquid tubes 540 are provided and connected to the respective tube joints 523, 524, and these second liquid tubes 540 are connected to the negative pressure tank 205, the various pumps, the various on-off valves, and the like, disposed inside the cleaning liquid and negative pressure supply unit 500. However, the present disclosure is not limited to the example. In a case when connection parts of the negative pressure tank 205, pumps, and on-off valves are provided in positions respectively corresponding to the tube joints 523, 524, the negative pressure tank 205, the pumps, or the on-off valves may be connected directly to the tube joints 523, 524.

Further, in the above-described embodiment, the description is given using the cleaning liquid and negative pressure supply unit 500 as an example of detachable units. That is, the description is given by taking as an example a detachable unit that supplies cleaning liquid to perform suction cleaning. However, the present disclosure is not limited to this example, and the detachable unit may include a negative pressure tank used for suction by a maintenance unit and a pump for generating negative pressure.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A printing apparatus comprising:

a plurality of print heads configured to eject liquid;

a maintenance unit configured to perform maintenance on the plurality of printheads; and detachable units provided in correspondence to the plurality of printheads and each including a negative pressure tank used for suction by the maintenance unit and a pump for generating negative pressure, wherein the detachable units each includes a valve configured to open and to close a flow channel and wherein the negative pressure tank is disposed at a location lower than the valve and the pump in a direction of gravitational force.

2. The printing apparatus according to claim 1, further comprising tubes connected to the detachable units, wherein, in a case when a direction in which the detachable units are detached from a main body of the printing apparatus is a front side, joints for connecting the tubes to the detachable units are provided at locations except for the front side.

3. The printing apparatus according to claim 2, wherein the tubes each communicates with the negative pressure tank and the pump via a corresponding one of the joints.

4. The printing apparatus according to claim 2, wherein the tubes communicate with a storage tank configured to store waste liquid.

5. The printing apparatus according to claim 1, wherein the maintenance unit includes a negative pressure application unit communicating with the pump of a corresponding one of the detachable units and configured to perform suction cleaning while facing a nozzle formation surface of a corresponding one of the printheads.

6. The printing apparatus according to claim 5, wherein the detachable units each includes a second pump for supplying the maintenance unit with cleaning liquid used for the suction cleaning.

7. The printing apparatus according to claim 6, wherein the maintenance unit includes a liquid application unit communicating with the second pump of a corresponding one of the detachable units and configured to apply the cleaning liquid to the nozzle formation surface of a corresponding one of the printheads.

8. The printing apparatus according to claim 1, wherein, in a case when a direction in which the detachable units are detached from a main body of the printing apparatus is a front side, wire harnesses connected to the detachable units are connected to the detachable units at locations except for the front side.

9. The printing apparatus according to claim 1, wherein, in a case when a direction in which the detachable units are detached from a main body of the printing apparatus is a front side, the detachable units each have a handle at the front side.

10. A printing apparatus comprising:

a plurality of print heads configured to eject liquid;

a maintenance unit configured to perform maintenance on the plurality of printheads;

detachable units provided in correspondence to the plurality of printheads and each including a negative pressure tank used for suction by the maintenance unit and a pump for generating negative pressure;

a negative pressure application unit, included in the maintenance unit, communicating with the pump of a corresponding one of the detachable units and configured to perform suction cleaning while facing a nozzle formation surface of a corresponding one of the printheads;

a second pump, included in each of the detachable units, configured to supply the maintenance unit with cleaning liquid used for the suction cleaning;

a second storage tank configured to store the cleaning liquid to be supplied to the maintenance unit; and second tubes communicating with the second storage tank and connected to the detachable units, wherein, in a case when a direction in which the detachable units are detached from a main body of the printing apparatus is a front side, joints for connecting the second tubes to the detachable units are provided at locations except for the front side.

11. The printing apparatus according to claim 10, wherein the detachable units each further includes a valve configured to open and to close a flow channel.

12. The printing apparatus according to claim 11, wherein the negative pressure tank is disposed at a location lower than the valve and the pump in a direction of gravitational force.

13. A printing apparatus comprising:

a plurality of print heads configured to eject liquid;

a maintenance unit configured to perform maintenance on the plurality of printheads; and detachable units provided in correspondence to the plurality of printheads and each including a negative pressure tank used for suction by the maintenance unit and a pump for generating negative pressure, wherein the maintenance unit has a cap support member configured to support a plurality of capping mechanisms configured to protect nozzle formation surfaces of the plurality of printheads, the cap support member including:

a plurality of supply flow channels configured to supply liquid from a second storage tank respectively to the plurality of capping mechanisms using a third pump, the second storage tank configured to store cleaning liquid;

three-way valves provided between the supply flow channels and the capping mechanisms and configured to switch between supplying the liquid to the capping mechanisms and allowing the capping mechanisms to communicate with an atmosphere; and a valve support member configured to support the plurality of three-way valves provided in correspondence to the capping mechanisms, and wherein the valve support member is disposed at one end of the cap support member.

14. The printing apparatus according to claim 13, wherein, with the capping mechanisms protecting the printheads, a space is formed near the one end of the cap support member where the valve support member is disposed.

15. The printing apparatus according to claim 13, wherein the three-way valves each has an atmosphere communication port, and the atmosphere communication port is provided at a location higher than a capping surface of a corresponding one of the capping mechanisms in a direction of gravitational force.

* * * * *